United States Patent [19]

Lupton et al.

[11] Patent Number: 5,062,956
[45] Date of Patent: Nov. 5, 1991

[54] BIOREMEDIATION OF CHROMIUM (VI) CONTAMINATED AQUEOUS SYSTEMS BY SULFATE REDUCING BACTERIA

[75] Inventors: F. Stephen Lupton, Evanston; Louis J. DeFilippi, Mt. Prospect; James R. Goodman, Chicago, all of Ill.

[73] Assignee: Allied-Signal Inc., Morris Township, Morris County, N.J.

[21] Appl. No.: 496,462

[22] Filed: Mar. 20, 1990

Related U.S. Application Data

[63] Continuation-in-part of Ser. No. 177,557, Apr. 4, 1988, abandoned.

[51] Int. Cl.$^5$ .............................................. C22F 1/62
[52] U.S. Cl. ................................. 210/611; 210/631; 210/720; 210/724; 210/913; 435/262
[58] Field of Search ............... 210/610, 611, 630, 631, 210/719, 720, 724, 757, 912, 913; 423/DIG. 17, 55, 607; 435/282, 260, 262; 425/57

[56] References Cited

U.S. PATENT DOCUMENTS

| | | |
|---|---|---|
| 3,941,691 | 3/1976 | Romanenko et al. |
| 4,260,491 | 4/1981 | Cassidy et al. ................. 210/720 |
| 4,468,461 | 8/1984 | Bopp ............................. 435/253 |
| 4,522,723 | 6/1985 | Kauffman et al. .............. 210/611 |
| 4,701,261 | 10/1987 | Gibbs et al. ................... 435/262 |
| 4,758,344 | 6/1988 | Wildenauer .................... 210/630 |
| 4,789,478 | 12/1988 | Revis et al. .................... 210/611 |
| 4,839,052 | 6/1989 | Maree ............................ 210/912 |

OTHER PUBLICATIONS

R. H. Smillie, K. Hunter & Margaret Loutit, "Reduction of Chromium(VI) by Bacterially Produced Hydrogen Sulphide in a Marine Environment", Water Research, 15, 1351-54 (1981).

Primary Examiner—Robert A. Dawson
Assistant Examiner—Joseph Drodge
Attorney, Agent, or Firm—Eugene I. Snyder; Harold N. Wells; Richard C. Stewart

[57] ABSTRACT

A method of reducing soluble Cr(VI) levels in aqueous wastes from 200 ppm or more to less than 1 ppm, particularly to less than 0.05 ppm, preferably to less than 0.01 ppm, uses fermentative sulfate-reudcing anaerobic bacteria to reduce Cr(VI) to Cr(III) and immobilize the latter as the extememly insoluble hydroxide. The process is readily adapted to operate continuously using a bioreactor containing sludge with sulfate-reducing anaerobic bacteria and operated as a chemostat.

7 Claims, 1 Drawing Sheet

Process Flow Scheme For Removal
Of
Dissolved Cr (VI)

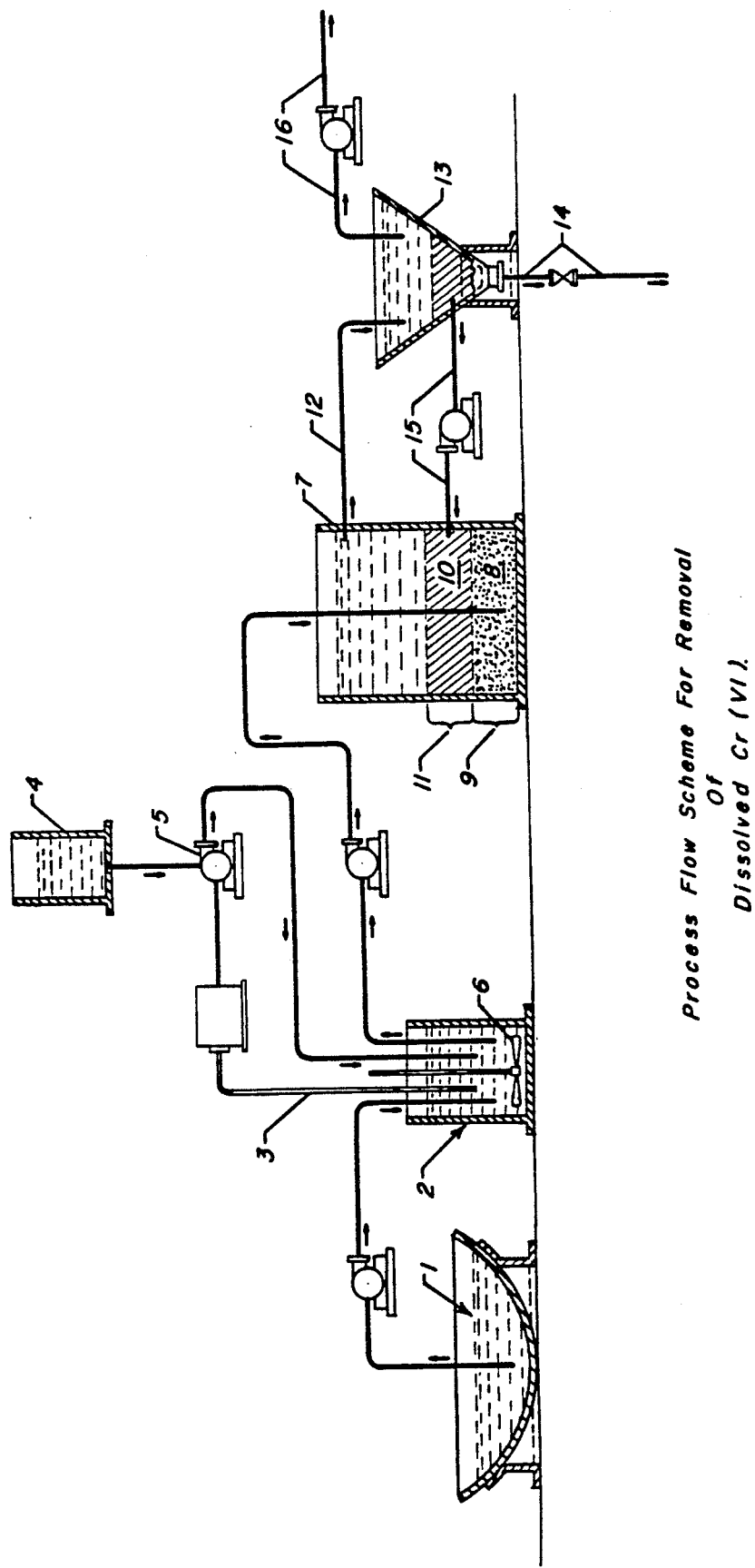
Process Flow Scheme For Removal Of Dissolved Cr (VI).

BIOREMEDIATION OF CHROMIUM (VI) CONTAMINATED AQUEOUS SYSTEMS BY SULFATE REDUCING BACTERIA

CROSS-REFERENCE TO RELATED APPLICATIONS

This application is a continuation-in-part of U.S. Ser. No. 177,557, filed Apr. 4, 1988, now abandoned.

BACKGROUND OF THE INVENTION

One of the hallmarks of contemporary civilization is that each increment of technological progress almost invariably is accompanied by a similar increment of environmental regress. As the pace of technological advances quickens so does the march of environmental deterioration. The realization of environmental damage has occurred only relatively recently, so that present society finds itself burdened with the accumulated sins of the not-too-distant past. Many such burdens manifest themselves as toxic waste sites, i.e., geographical areas formerly used indiscriminately, or without recognition of inherent dangers, as dumps for waste materials and which now contain concentrations of one or more materials inimicable to the continued health of humans and of the environment generally.

A hallmark of current society is its acceptance of the undesirability of environmental degradation coupled with a determination to minimize it and reverse it wherever possible. A first step is the identification of potentially toxic sites and the materials which render such sites hazardous. A next step is the identification of methods and procedures which can render such sites at least environmentally neutral. Because the problems associated with toxic wastes are relatively new solutions for cleaning up such sites often are wanting or incomplete. The current surge in activity in developing adequate procedures for neutralizing toxic waste sites is a response to the new awareness of the undesirability of such dumps as well as an emerging determination to reverse the environmental trends of the past.

One kind of hazardous waste arises from the chromium roasting process, where chromium in iron-containing ore is oxidized to chromate to enable separation of the water-soluble chromate from insoluble ferric oxide. The residues from the aforementioned process contain chromate—more generally chromium as Cr(VI)—usually in a highly alkaline environment. When either acid or alkaline waters are neutralized, a very high concentration of ionic species, such as $CaCl_2$, $Na_2SO_4$, NaCl, NaOAc, CaOAc, are present in amounts up to about 10–15 wt. %. Under appropriate circumstances accumulated surface water can contain rather high concentrations of Cr(VI) in solution as chromate, with a concentrations of 25 milligrams per liter chromate and higher not being unusual. Since Cr(VI) is toxic at levels of about 5 ppm (as chromate) to humans, such surface water presents an immediate hazard to animals and an indirect hazard via the normal food chain to humans. Consequently, the Environmental Protection Agency has mandated that discharged waters must contain below 0.05 wt. ppm total chromium. Additionally, permeation of surface water through underlying strata threatens contamination of the subsurface water which could render wells unpotable and adversely affect marine life.

This application is directed toward immobilization of Cr(VI) dissolved in liquid aqueous wastes especially those containing a high concentration of ionic species. By "immobilization" is meant reducing the soluble Cr(VI) level, measured as chromium, to less than 0.05 part per million, preferably less than 0.01 ppm while transforming the remainder of the originally soluble Cr(VI) to an insoluble form of chromium which is highly resistant to leaching and which therefore minimizes environmental hazards. The method of our invention basically involves growing sulfate-reducing anaerobes in the liquid aqueous waste containing unacceptably high levels of chromium. What happens is that Cr(VI) is reduced to Cr(III) which precipitates as the hydroxide, an extremely insoluble species, within the pH range at which fermentation is conducted. The Cr(III) hydroxide settles as a solid and is removed or is mixed with other solid residues. When mixed with other solid residues the leachate therefrom is very low in Cr(VI), in fact sufficiently low as to pose virtually no environmental hazard. The naturally occurring reduction of Cr(VI) to Cr(III) by hydrogen sulfide produced by sedimentary bacteria previously has been noted by R. H. Smillie, K. Hunter, and M. Loutit, "Reduction of Chromium (VI) by Bacterially Produced Hydrogen in a Marine Environment," Water Research, 15, 1351–4 (1981). However, it is believed that sulfate-reducing anaerobic bacteria were considered to be unsuitable for treating industrial waste waters because of the inherent toxicity of chromium to microorganisms, as the following prior art indicates.

Revis et al. in U.S. Pat. No. 4,789,478 provide a brief discussion of many prior art patents pertaining to removal of heavy metals from waste waters using microorganisms, but omit reference to the reduction of Cr(VI).

In U.S. Pat. No. 4,522,723 Kauffman et al. disclose a process for reducing the concentration of water soluble ionic heavy metal species and sulfate ions in aqueous wastes. Although their principal interest appears to be in reducing uranium and molybdenum in mining waste waters, Kauffman et al. suggest the method can be employed with metal ions from many groups of the Periodic Table, including Group VIb, which contains chromium. However, there is no indication that the patentees' method had been applied to chromium-containing waters from industrial waste waters where the concentrations of chromium and other ionic species are very high. Such waters are particularly difficult to treat since they inhibit or are toxic to sulfate-reducing bacteria.

Romanenko et al. in U.S. Pat. No. 3,941,691 are consistent with Kauffman et al. and state that sulfates may be reduced to $H_2S$, which then reacts with soluble iron to form insoluble iron sulfides using sulfate reducing bacteria. However, they state that disulfovibro desulfuricans bacteria are not capable of reducing chromates and bichromates. Their invention resides in the selection of a microorganism which directly reduces the chromates and bichromates to chromium hydroxides without forming hydrogen sulfides.

Bopp, in U.S. Pat. No. 4,468,461 also discloses a new bacteria strain especially intended to remove chromates from waste water. In contrast with Kauffman et al. who used bacteria to produce $H_2S$ which thereafter reduced the dissolved metals and presumably precipitated them as the metal sulfide, the microorganism used by Bopp directly reduced $Cr^{+6}$ to $Cr^{+3}$ and had resistance to the poisoning effect of dissolved chromium. In fact, the patentee states that his microorganism is capable of reducing $Cr^{+6}$ up to 2000 ppm while other bacteria would not grow in concentrations more than 10–20 ppm. The microorganism is stated to be able to grow in either aerobic or anaerobic conditions, although aerobic conditions appear to be preferred. An organic reducing agent is required to satisfy the nutritional requirements of the microorganisms.

The present inventors have found that, contrary to the suggestions of the prior art, that it is possible to use sulfate-reducing bacteria to reduce Cr(VI) to Cr(III).

SUMMARY OF THE INVENTION

An object of this invention is to immobilize soluble Cr(VI) in liquid aqueous residues containing up to 5–10 wt. percent dissolved salts, where the aqueous residue after treatment contains less than 0.05 ppm, preferably less than 0.01 ppm soluble Cr(VI). An embodiment comprises adjusting the pH of the aqueous residue to between about 6.5 and about 9.5 by adding a neutralizing agent and thereby further increasing the amount of dissolved salts, adding a carbon source sufficient to provide microbial growth, adjusting the sulfate level to at least 10 millimols per liter of solution since sulfate is necessary for hydrogen sulfide production, and adding other nutrients for fermentative sulfate-reducing anaerobic bacteria. The aqueous residue then is diluted, if required, to provide no more than 200 ppm Cr(VI) per liter of diluted residue and contacted with the sulfate-reducing anaerobes in the absence of oxygen for a time sufficient to reduce Cr(VI) to the desired level, particularly below 0.05 ppm, preferably below 0.01 ppm. In a more specific embodiment the pH is adjusted to between about 7.0 and 8.5. In a still more specific embodiment the acid used for pH adjustment serves as the carbon source. In a yet more specific embodiment the acid is acetic acid. In yet another embodiment the process is conducted in a continuous bioreactor.

DESCRIPTION OF THE FIGURE

The FIGURE shows a process for the bioremediation of Cr(VI) using a continuous bioreactor.

DESCRIPTION OF THE INVENTION

The feedstocks which are acted upon by our invention are liquid aqueous residues, often accumulations of surface water, containing undesirable amounts of Cr(VI) dissolved therein. In what follows the level of soluble Cr(VI) always refers to chromate, dichromate, etc. reported as chromium. For example, the phrase "10 ppm Cr(VI)" means "10 ppm chromium." The levels of soluble Cr(VI) usually are at least 5 ppm, measured as chromium, and concentrations of 25 milligrams per liter (25 ppm) and higher are not unusual. For example, in the case of chromic acid spills, the concentration of Cr(VI) could be at its limit of solubility. Hexavalent chromium is inhibitory and toxic to microorganisms and if the concentration is above about 200 ppm, the water should be diluted to below that value. The liquid aqueous residues generally contain substantial amounts of other salts, especially calcium salts, which would be expected based on current literature to hinder the growth of sulfate reducing microorganisms.

The Cr(VI)-laden aqueous residues are quite variable in nature, sometimes being highly alkaline, typically having a pH near 11–12. This is most often observed when the solution results from contact with Cr(VI)-laden lime. In other cases, the solution is the result of a spill of chromic acid, which is composed of sulfuric acid and Cr(VI) species. In either case the pH of the solution must be adjusted to a range which will permit the growth and metabolism of the appropriate microorganisms. It is important for the success of this invention to adjust the pH of the liquid aqueous residues to between about 6.5 and about 9.5, even more typically between about 7.0 and about 8.5. The nature of the neutralizing agent used to adjust the pH is not particularly important when viewed from the aspect of its being merely a pH adjuster. However, some ancillary properties may importantly influence the choice of acid or base used. For example, acetic acid is a highly preferred acid to use in our invention because it simultaneously acts to adjust the pH of alkaline waters and to provide a carbon source for the actively growing culture used in a later stage of this invention. The aqueous residue needs to have sulfate present at a concentration of at least about 10 millimolar, usually between 10 and 100 millimolar, hence the use of sulfuric acid to adjust the pH may be advantageous. However, where use of the acid as a carbon source or a sulfate source is unimportant or immaterial then virtually any acid can be used so long as it is not independently toxic to the microorganisms in the actively growing culture. Examples of other acids which may be used in the practice of this invention include mineral acids such as phosphoric acid and hydrochloric acid, various sulfonic acids, and water soluble carboxylic acids.

It should be understood that the use of acid or base to neutralize the water containing Cr(VI) means that additional ionic species are being introduced, and that the resulting aqueous medium becomes hostile toward sulfate-reducing microorganisms. Consequently, the acid or base should be selected with this consideration in mind.

The liquid aqueous residues which are treated in this invention generally have an insufficient carbon source to sustain microbial growth. Consequently, it is important to add a carbon source as well as to adding a culture to the aqueous residue. Where acetic acid, or other carboxylic acids, are used to adjust the pH of the residue then acetate, or another carboxylate grouping, can act as the sole carbon source. However, as will be commented on below, performance of the fermentative system can be increased by adding additional carbon sources as nutrients. The amount of carbon source present need only be sufficient to sustain life in the microbial population for a time long enough to reduce the soluble Cr(VI) level to the desired level, down to under about 0.01 ppm or below and to contribute enough reducing power for $H_2S$ generation. If the aqueous residue is deficient in other nutrients such as nitrogen and phosphorus, and/or trace elements necessary for microbial growth these, too, need to be added prior to adding the culture. Because such requirements will be readily recognized and met by those versed in the art they need no further elaboration at this time.

It is necessary to provide sufficient sulfate in the aqueous residue to make the fermentation effective in reducing soluble Cr(VI) to levels under 0.01 ppm when measured as chromate. In fact, it has been found that for effective chromium removal soluble sulfate must be present in the liquid aqueous residue in an amount of at least 10 millimoles per liter. Sulfate may be added as the acid, sulfuric acid, or as various sulfate or bisulfate salts, such as ammonium sulfate, sodium sulfate, potassium sulfate, magnesium sulfate, sodium acid sulfate, potassium acid sulfate, and so forth. The use of ammonium sulfate is especially convenient.

The aqueous residue whose pH has been adjusted to between 6.5 and 9.5 and containing a carbon source, sulfate other nutrients as needed, is inoculated with a fermentative sulfate-reducing anaerobic bacteria which is not methanogenic. The most common sulfate-reducing anaerobes are sulfate reducing bacteria arising from the genus desulfovibrio, such as D. vulgaris, D. desulfuricus and D. baculatus; species of the genus Desulfobulbus such as D. proponicus; anaerobes of the genus Desulfobacter, such as D. postgatei; and members of the Desulfotomaculum genus, such as D. nigrificans. It is to be understood that both the genera and specie cited above are merely illustrative of sulfate-reducing anaerobes which may be used in the practice of our invention, and many more such examples of suitable anaerobes will be readily recognized by the skilled worker.

Among the convenient sources of suitable hydrogen sulfide producers may be mentioned beds of rivers, creeks, and other bodies of water where sulfate is present. Septic tanks and marine environments also may be fruitful sources of sulfate-reducing anaerobes. However, a saline source, such as an estuary, marine environment or saline lake is the preferred source since it will have a greater likelihood of yielding a salt-tolerant consortium.

Suitable microorganisms may be isolated by taking a sample from a saline body of water, such as a saltern, brine pool, salt lake, or marine or estuarine environment and adding the sample to a nutrient broth containing essential mineral salts, a carbon source such as an acetate, lactate, or molasses and a high (i.e. 5–15% by weight) concentration of a mineral salt such as sodium chloride, sodium sulfate, calcium chloride and the like. The broth container will be designed to exclude oxygen so that the microorganisms are grown under anaerobic conditions.

Fermentation of the liquid aqueous residue by the actively growing culture of anaerobes is continued for a time sufficient to reduce the soluble Cr(VI) level to the desired level, preferably 0.01 ppm as chromium. A particularly favored means of carrying out this reduction is by use of a continuous bioreactor, that is, maintenance of a continuous culture under conditions where a Cr(VI)-laden aqueous residue is pumped into a reactor and an equal volume of effluent containing the desired level of Cr(VI) is continually removed. Such a system is depicted in FIG. 1 and elaborated upon in greater detail below.

Continuous cultures, or continuous bioreactors, are not new per se and their mechanics and characteristics have been described; see, for example, T. D. Brock, "The Biology of Microorganisms," pp. 244–251. Such a system in equilibrium is characterized by a steady state where the cell number and nutrient status remain constant. In that variant of a continuous-culture device referred to as the chemostat, which is envisioned as the preferred mode of operation in our invention, both population density and growth rate of the microorganism can be varied by the investigator. Two critical variables used in the operation of the chemostat are the flow rate of the culture medium reservoir and the concentration of a limiting nutrient in the reservoir. In our invention the reservoir is the Cr(VI)-laden aqueous residue whose pH has been adjusted to between about 6.5 and about 9.5 and containing an inexpensive carbon source, such as acetic acid, lactic acid, or molasses, as the limiting nutrient. However, it needs to be recognized that increased performance of the chemostat, i.e., increased immobilization rate of Cr(VI), can be obtained by placing additional nutrients (i.e., carbon source) into the reservoir. The most important parameter of the chemostat is the dilution rate or washout rate, which is the rate at which medium flows through the system. The dilution rate determines the cell-division rate of the population and by altering flow rate one can directly and quickly alter the growth rate of the anaerobes present in the bioreactor. When the dilution rate is less than or equal to the maximum growth rate of the anaerobes, a population of microorganisms is maintained within the reactor. When the dilution rate is greater than the maximum growth rate of the microorganism, the latter are washed out of the reactor and the process will fail. Such high dilution rates, where the organism cannot grow fast enough to keep up with its dilution, are referred to as the washout rate. It then can be readily seen that for proper operation of a continuous reactor as envisaged in the process of FIG. 1 the dilution rate of incoming chromium-laden water must be less than the washout rate for the particular bioreactor. From what was said previously, it should be apparent that the washout rate will depend on such variables as the type of anaerobe in the bioreactor, the concentration of carbon source in the chromium-laden feed, and the temperature at which the bioreactor is operated. However, all these factors can be readily determined and adjusted in the field.

In brief, the bioreactor contains an anaerobic sludge adhering to sand, gravel, woodchips, activated carbon, and so forth, in an unstirred vessel. The pH-adjusted chromium-laden feed containing carbon and, where needed, other nutrients such as phosphate, sulfate, nitrogen, and trace elements, is added continuously. Because hexavalent chromium is itself inhibitory and eventually toxic to microorganisms when above a certain level, the feed rate will be adjusted as to permit adequate dilution of Cr(VI) in the reactor, preferably to about 200 ppm or below. Effluent will be removed at the same rate feed is introduced, and the system will be balanced so as to achieve the desired Cr(VI) level in the effluent, preferably less than 0.01 ppm. We have found that at solution concentrations greater than about 180 to 360 ppm the reduction of Cr(VI) is inhibited. However, this should not be considered an upper limit on a fixed bed of cells in contact with, for example, gravel, since paths will be formed through the bed with borders of lower concentration. Consequently, it is expected that in continuous operation with fixed beds up to about 2000 ppm chromium could be treated.

Turning to the process as depicted in FIG. 1 in greater detail, 1 refers to Cr(VI)-laden surface water which is to be treated. This is pumped to a reservoir 2 operated as a pH stat. That is, a probe measuring pH, 3, acts as the sensor element in a controller which maintains the pH constant in the interval between 6.5 and 9.5, and even more commonly between about 7.0 and 8.5. The circuit controls addition of acid from a reservoir, 4, through a metering pump or a valve 5 into the feed reservoir 2 which is continually mixed by a mixing means, such as stirrer 6. An additional carbon source(s) and/or sulfate can be added to the feed reservoir so as to supply all necessary nutrients in their requisite amounts. Feed is continually pumped to the bottom of the bioreactor 7, which commonly will contain some means for dispersing the incoming feed through the bioreactor. A particularly simple means of doing so is to have the feed enter at a bed containing gravel, 8, and sludge lining the bottom of the reactor.

Immediately above the dispersant zone, 9, is a layer of sludge, 10, containing sulfate-reducing anaerobes and which functions as the "active" bioremediation site in the reactor. In this sludge layer, 11, the actively growing anaerobes, fed by the carbon source in the incoming feed, reduce Cr(VI) to Cr(III) as the very insoluble $Cr(OH)_3$. The sludge layer usually will come from a locally convenient source, such as a river or creek bed, a septic tank, and so forth, which naturally contain anaerobic hydrogen-sulfide producing microorganisms which can serve as the fermentation culture in the bioreactor 7.

The space above the sludge layer contains more or less clear liquid with the Cr(VI) at a level under 1 ppm, and typically contains chromium at less than 0.05 ppm, particularly below 0.01 ppm. An overflow pipe, 12, at the top of the vessel leads this liquid, which can also contain suspended sludge and $Cr(OH)_3$, into a settling tank, 13. If desired, water treatment polymers (flocculants) can be added to the settling tank to enhance flocculation of the sludge and suspended anaerobes. When the accumulation of solids becomes excessive it is drained via 14, or recycled to the bioreactor if needed via 15. The clarified water from the settling tank is then discharged, as by discharge pump 16.

The examples which follow illustrate the operation of our invention. It will be recognized by the skilled artisan that many variants are possible, all of which are intended to be encompassed within our invention, and the examples below are not to be construed as limiting in any way.

EXAMPLE I

Standing water from a chromium contaminated site in Jersey City, N.J., containing 11 mg/L chromate at a pH of 12 and containing ammonium sulfate at a concentration of 0.5 weight-volume percent (38 millimolar) was used as the feedstock. A 2 liter mixing tank acted as the reservoir for the feedstock and contained a pH probe connected to an automated pH controller and a pump which maintained the contents of the mixing tank at a pH between 7 and 8 by controlling the addition of 25 percent acetic acid to the mixing tank. From the tank the pH-adjusted chromium waste water flowed under gravity to a 1 liter anaerobic column reactor 6 cm in diameter and 36 cm high. Feedstock entered at the bottom of the anaerobic reactor and exited through an overflow at the top. The anaerobic reactor contained 10 cm of gravel mixed with anaerobic sludge at the bottom overlayed with 10 cm of sludge. The remainder of the column consisted of slightly turbid water, The rate of feedstock addition was controlled by the rate of pumping to the neutralization vessel and the temperature of the reactor was that of the ambient environment (approximately 20° C.). The performance of the reactor at different dilution rates (hydraulic loading rate or space velocity) is shown in Table 1. As can be seen, chromate in the effluent was below the detection level (0.21 mg/L at that time) at all operating conditions. However, at the highest dilution rate sludge began to oxidize as noted by a gray rather than black appearance which eventually lead to incomplete Cr(VI) removal.

TABLE 1

Effect of Dilution Rate on Cr (VI) Removal

| Dilution Rate (hr-1) | Reactor Condition | Chromate in Effluent (mg/L) |
|---|---|---|
| 0.006 | black sludge (reduced) | <0.21 |
| 0.020 | black sludge | <0.21 |
| 0.035 | black sludge | <0.21 |
| 0.050 | grey sludge | <0.21 |

To determine the effect of adding organic substrates in addition to acetic acid on the performance of the reactor, yeast extract and trypticase-soy broth were added to the chromium water feed tank at concentrations of 0.01% (w/v) and 0.1% (W/V) respectively. The removal of chromium in the presence of organic substrates is shown in the table below.

TABLE 2

Effect of Added Nutrients on Cr (VI) Removal

| Dilution Rate (hr-1) | Reactor Condition | Chromate in Effluent (mg/L) |
|---|---|---|
| 0.006 | black sludge | <0.21 |
| 0.020 | black sludge | <0.21 |
| 0.035 | black sludge | <0.21 |
| 0.050 | black sludge | <0.21 |
| 0.060 | black sludge | <0.21 |
| 0.100 | black sludge | <0.21 |

As can be seen from the foregoing table, the presence of additional nutrients in the feedstock permits an even higher dilution rate with essentially complete chromate removal,. The total volume of feedstock treated was equal to 18 liters with a level of Cr(VI) present in the effluent from the reactor being always below the level of detection of 0.21 mg/L.

EXAMPLE II

Microorganisms capable of growing at various pHs were selected by the following approach. To mineral supplemented with sodium lactate, sodium acetate, yeast extract and sodium thioglycolate, and adjusted to pHs ranging from 6.75 to 9.52 was added either a mixed culture of anaerobic sludge (grown under conditions that select for sulfate reducing microorganisms) or a mixed culture of sulfate reducing bacteria. A nitrogen atmosphere was used to ensure anaerobic growth. Except for the highest pH, microorganisms grew readily at all the pHs tested. Hydrogen sulfide was produced in all the growing cultures and black precipitates (presumable metal sulfides) were formed.

To demonstrate the ability of these microorganisms to bioremediate (Cr(VI) present in an aqueous layer, the following experiment was performed. Water samples were collected from wells drilled at a site in the Baltimore area where spills of Cr(VI) were known to have occurred. Sample #1 had a pH of 6.84 and a Cr(VI) concentration of 29 ppm. Its pH was raised with potassium hydroxide solution. Sample #2 had a pH of 11.82 and Cr(VI) concentration of 24 ppm. Its pH was lowered with CHl solution. Fifty mL of each sample was adjusted to the pH shown in Table 3 and mixed with an equal volume of the mineral salts medium, complete with carbon source, as described above. The samples were placed into sealed vials, blanketed with nitrogen and inoculated with anaerobic sludge whose organisms had been selected to grow at that particular pH. The level of chromate was determined in each vial, the microorganisms added, add the level of chromate again determined. After 2-5 days the level was determined again, more microorganisms added, and the level of chromate once again measured. Since the microorganisms had been cultured for different periods of time, and since they grew a little slower at the higher pHs, the ability of the microorganisms to bioremediate the Cr(VI) varied from sample to sample. Control experiments, where the samples were not inoculated, showed no drop in Cr(VI) concentration. Results are summarized in Table 3.

TABLE 4-continued

| | Cr (VI), ppm | |
| Day | Sample 1 | Sample 2 |
| --- | --- | --- |
| 21 | 106 | 0.007 |
| 29 | 85 | <0.006 |
| 36 | 56 | — |
| 40 | 10 | — |
| 48 | 0.544 | — |
| 55 | <0.013 | — |
| 61 | <0.006 | — |

TABLE 3

Growth of Anaerobic Sludge Bacteria in Two Different Chromium Samples

| | | DAY 1 | | DAY 2 | | DAY 5 | | DAY 6 | DAY 7 | DAY 8 |
| | Final pH | Initial Cr (VI) PPM | Cr (VI) After Sulfate Reducing Microorganisms | Initial Cr (VI) PPM | Cr (VI) After Sulfate Reducing Microorganisms | Initial Cr (VI) PPM | Cr (VI) After Sulfate Reducing Microorganisms | Initial Cr (VI) PPM | Initial Cr (VI) PPM | Initial Cr (VI) PPM |
| --- | --- | --- | --- | --- | --- | --- | --- | --- | --- | --- |
| Sample No. 1 | 7 | 14.6 | 3.5 | 9.9 | — | <0.21 | <0.21 | — | — | — |
| | 8 | 14.6 | 13.4 | 13.6 | — | 10.6 | <0.21 | — | — | — |
| | 9 | 14.6 | 14.0 | 14.6 | — | 12.0 | 4.9 | 4.9 | 0.73 | <0.21 |
| | | DAY 1 | | DAY 4 | | | | | | |
| Sample No. 2 | 7 | 12.3 | 4.3 | 2.9 | <0.21 | | | | | |
| | 8 | 12.1 | 9.9 | 7.1 | <0.21 | | | | | |
| | 9 | 11.8 | 11.4 | <0.21 | <0.21 | | | | | |

EXAMPLE III

A Cr(VI)-containing water initially having 775 wt. ppm Cr(VI) was neutralized with hydrochloric acid to a pH or 8.0. A salt solution containing for each liter of water 13.27 g of sea salts (Sigma Chemical Corp.), 1.199 g of ammonium sulfate, and 0.0607 g super phosphate was prepared to provide a synthetic solution of higher ionic strength. Into a 150 mL serum bottle (Bellco) was added 48 mL of the salt solution described above. Then the Cr(VI) solution was added to give an estimated initial concentration of 194 ppm (Cr(VI). A sufficient amount of plain water was added to provide a total volume of 100 mL. Two (2) mL of a solution made by dissolving 20 mL of a ca. 50% solution of molasses in 100 mL of water was placed in a separate bottle. Both bottles were sealed and the space above the solutions was flushed with nitrogen for 15 minutes. The bottles were then autoclaved at 120° C. for 20 minutes. After cooling, the molasses solution was added to the bottle containing Cr(VI) and salt solution and the bottle inoculated with 0.5 mL of a suspension of sulfate-reducing bacteria. Each sample was maintained at room temperature and sampled periodically to determine the reduction of Cr(VI) which had occurred. The pH was maintained at 8.0 by adding NaOH solution. The results of two samples are given in the following table. It can be seen that even in the presence of a saline environment the sulfate-reducing bacteria were capable of reducing the Cr(VI) to below 0.01 ppm.

TABLE 4

| | Cr (VI), ppm | |
| Day | Sample 1 | Sample 2 |
| --- | --- | --- |
| Start | 125 | 83.9 |
| 1 | 166 | 81.6 |
| 6 | 152 | 55.1 |
| 7 | 148 | 54.7 |
| 8 | 144 | 49.6 |
| 9 | 127 | 41.7 |
| 13 | 136 | 84.2 |
| 16 | 116 | 1.43 |
| 19 | 129 | <0.12 |

We claim:

1. A method of reducing levels of Cr(VI) dissolved in a liquid aqueous residue resulting from chromium processing in amounts up to in excess of 200 ppm Cr(VI) said aqueous residue containing up to 5-10 wt. percent of dissolved salts comprising
   a) adjusting the pH of said aqueous residue to a value between about 6.5 and 9.5 by adding a neutralizing agent and thereby increasing the content of dissolved salts;
   b) adding to the pH adjusted residue (a) (1) a carbon source sufficient to sustain microbial growth, (2) a sulfate source sufficient to provide at least 10 millimoles sulfate per liter of said residue and (3) nutrients for sulfate-reducing anaerobic bacteria;
   c) diluting the aqueous residue of (b) to provide no more than 200 ppm of Cr(VI) per liter of diluted residue;
   d) contacting said diluted residue of (c) in the substantial absence of oxygen with sulfate-reducing anaerobic bacteria for a period of time sufficient to reduce the concentration of Cr(VI) to below about 0.05 ppm as chromium and to precipitate Cr(III) hydroxides.

2. The method of claim 1 where the pH is adjusted in (a) to a value between about 7.0 and about 8.5.

3. The method of claim 1 where the amount of Cr(VI) dissolved in the treated aqueous residue is less than about 0.01 ppm measured as chromium in (d).

4. A process for the continuous immobilization of Cr(VI) dissolved in resulting from chromium liquid aqueous residues processing resulting from chromium processing in amounts up to about 2000 ppm comprising transferring a portion of the liquid aqueous residue to a reservoir which maintains the pH of said aqueous residue at a value between about 6.5 and about 9.5, adding to the pH adjusted residue (a) a carbon source sufficient to sustain microbial growth, (b) a sulfate source sufficient to provide at least 10 millimols sulfate per liter of said residue, and optionally (c) nutrients for sulfate-reducing anaerobic bacteria, continuously delivering a portion of the pH adjusted liquid aqueous residue to a chemostat containing fermentative sulfate-reducing anaerobic bacteria in a sludge, and continuously removing as effluent an equal portion of treated aqueous residue containing less dissolved Cr(VI) than in the initial reside.

5. The process of claim 4 where the pH is adjusted in said reservoir to a value between about 7.0 and about 8.5.

6. The process of claim 4 where the amount of Cr(VI) dissolved in said effluent is less than about 0.05 ppm.

7. The process of claim 4 where the amount of Cr(VI) dissolved in said effluent is less than about 0.01 ppm.

* * * * *

UNITED STATES PATENT AND TRADEMARK OFFICE
CERTIFICATE OF CORRECTION

PATENT NO. : 5,062,956
DATED : November 5, 1991
INVENTOR(S) : F. Stephen Lupton, Louis J. DeFilippi and James R. Goodman It is certified that error appears in the above-identified patent and that said Letters Patent is hereby corrected as shown below:

On the Title page:
Abstract, line 4: "reudcing" should read --reducing--
         line 6: "extememly" should read --extremely--.
Column 8, line 33: "removal,." should read --removal.--
         line 40: after "mineral" and before "supplemented" insert --media--
         line 53: "(Cr(VI)" should read --Cr(VI)--
         line 61: "CHl" should read "HCl"
Column 9, line 1: "add" should read --and--
         line 32: "or" should read --of--
         line 39: after "ppm" insert --and 96 ppm--
         line 39: "(Cr(VI)" should read --Cr(VI)--

Signed and Sealed this

Fourth Day of May, 1993

Attest:

MICHAEL K. KIRK

Attesting Officer     Acting Commissioner of Patents and Trademarks